US010009328B2

(12) United States Patent
Smith et al.

(10) Patent No.: US 10,009,328 B2
(45) Date of Patent: Jun. 26, 2018

(54) SYSTEM, APPARATUS AND METHOD FOR PROVIDING PRIVACY PRESERVING INTERACTION WITH A COMPUTING SYSTEM

(71) Applicant: McAfee, Inc., Santa Clara, CA (US)

(72) Inventors: Ned M. Smith, Beaverton, OR (US); Sven Schrecker, Santa Clara, CA (US); Howard C. Herbert, Phoenix, AZ (US)

(73) Assignee: McAfee, LLC, Santa Clara, CA (US)

( * ) Notice: Subject to any disclaimer, the term of this patent is extended or adjusted under 35 U.S.C. 154(b) by 87 days.

(21) Appl. No.: 14/961,006

(22) Filed: Dec. 7, 2015

(65) Prior Publication Data
US 2017/0163616 A1    Jun. 8, 2017

(51) Int. Cl.
G06F 17/30    (2006.01)
H04L 29/06    (2006.01)

(52) U.S. Cl.
CPC ...... *H04L 63/062* (2013.01); *G06F 17/30598* (2013.01); *G06F 17/30867* (2013.01); *H04L 63/102* (2013.01)

(58) Field of Classification Search
USPC ............................................................ 726/7
See application file for complete search history.

(56) References Cited

U.S. PATENT DOCUMENTS

| | | | | |
|---|---|---|---|---|
| 6,986,046 | B1* | 1/2006 | Tuvell | G06F 21/6218 380/283 |
| 8,819,437 | B2* | 8/2014 | Wittenberg | H04L 9/3213 713/172 |
| 8,850,520 | B1* | 9/2014 | Pike | G06F 21/00 709/201 |
| 9,288,059 | B2* | 3/2016 | Nix | H04W 52/0235 |
| 9,565,172 | B2* | 2/2017 | Stahl | G06F 21/33 |
| 9,578,008 | B2* | 2/2017 | Sood | H04L 63/08 |
| 9,621,525 | B2* | 4/2017 | Brumley | H04L 63/061 |
| 2006/0123117 | A1* | 6/2006 | Heutchy | G06F 21/10 709/227 |
| 2006/0253432 | A1 | 11/2006 | Eagle et al. | |
| 2009/0043781 | A1 | 2/2009 | Kim et al. | |
| 2011/0167003 | A1 | 7/2011 | Nice et al. | |
| 2012/0110469 | A1* | 5/2012 | Magarshak | H04L 9/321 715/747 |
| 2012/0331409 | A1 | 12/2012 | Olliphant | |
| 2013/0080526 | A1 | 3/2013 | Gill et al. | |

(Continued)

OTHER PUBLICATIONS

International Searching Authority, "Notification of Transmittal of the International Search Report and the Written Opinion of the International Searching Authority," dated Feb. 20, 2017, in International application No. PCT/US2016/060851.

(Continued)

*Primary Examiner* — Amare F Tabor
(74) *Attorney, Agent, or Firm* — Blank Rome, LLP

(57) ABSTRACT

In one embodiment, a system including one or more hardware processors is: to receive a user request to access a website; sign a nonce with at least some of the plurality of group private keys, the at least some of the plurality of group private keys corresponding to personalization attributes of the website; and send the signed nonce to a web server to enable personalized interaction with the web server. Other embodiments are described and claimed.

17 Claims, 8 Drawing Sheets

(56) References Cited

U.S. PATENT DOCUMENTS

| | | | |
|---|---|---|---|
| 2013/0268755 A1* | 10/2013 | Simmons | G06F 21/10 713/156 |
| 2015/0089220 A1* | 3/2015 | Patel | H04L 65/1053 713/168 |
| 2016/0373260 A1* | 12/2016 | Jerkeby | H04L 9/3263 |
| 2017/0039389 A1* | 2/2017 | Smith | G06F 21/6263 |

OTHER PUBLICATIONS

Intel, "Premises-Aware Security Mitigates Healthcare Data Breaches", Intel White Paper, 2014, 6 pages.

* cited by examiner

SYSTEM, APPARATUS AND METHOD FOR PROVIDING PRIVACY PRESERVING INTERACTION WITH A COMPUTING SYSTEM

BACKGROUND

Web browsers use a variety of cookie types to enhance browsing experiences for user, content provider and advertisers alike. Among these cookies are personalization cookies that are used to remember information about the user in order to show relevant content to that user over time. For example, a web server might send a cookie containing the username last used to log into a website so that it may be filled in automatically the next time the user logs in.

Many websites use cookies for personalization based on user preferences. Then when the user accesses a page on the website, the server can personalize the page according to the user preferences. However, personalization cookies can be abused by web servers if used to construct a profile used to track user behavior. As such, there are security concerns in these and other uses of cookies.

DETAILED DESCRIPTION

Figure 1:
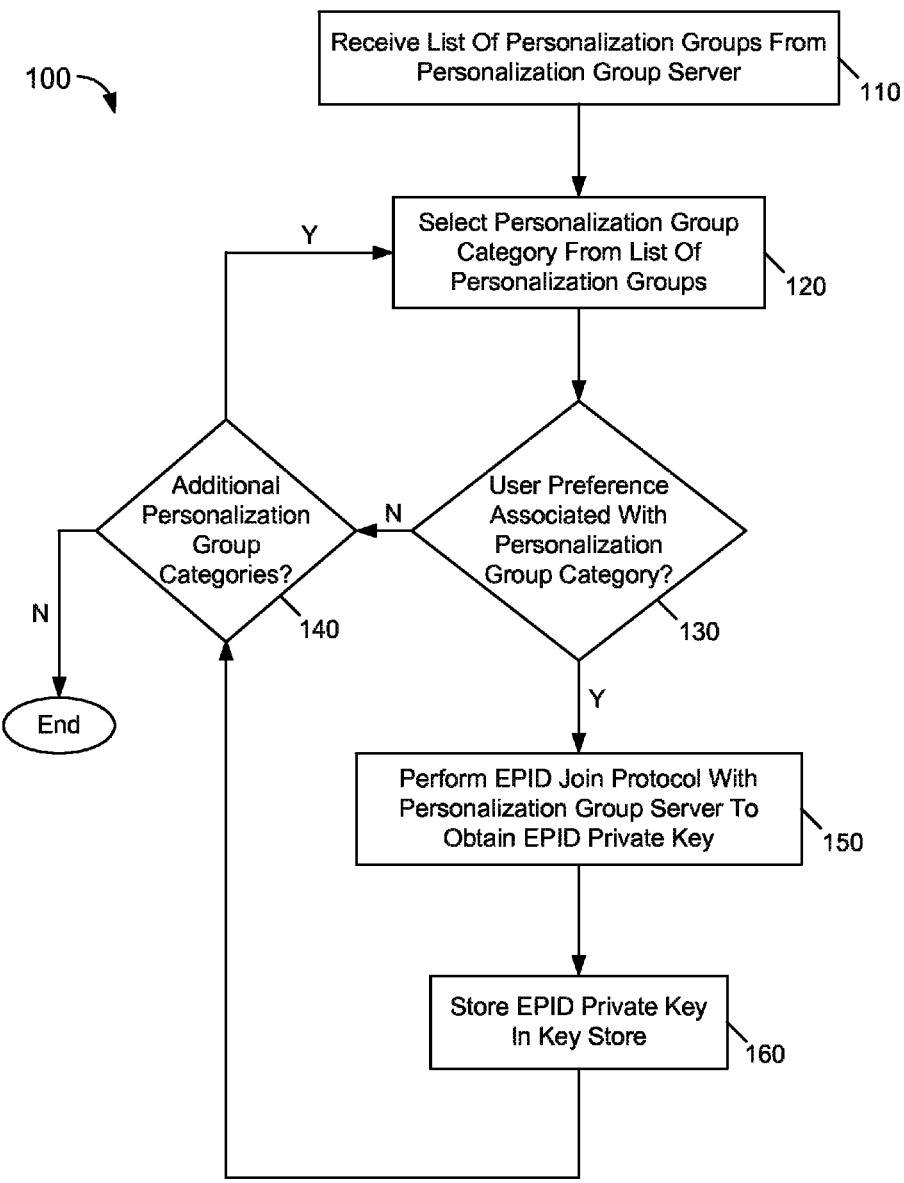
FIG. 1 is a flow diagram of a method for performing group preference settings for a user in accordance with an embodiment of the present invention.

In various embodiments, personalization attributes may be associated with enhanced privacy identification (EPID) groups, to enable communication of personalization attributes in a privacy-preserving manner. When a collection of EPID groups is associated with a user of a computing device, a corresponding set of EPID privacy keys may be established and securely stored such that these keys may be leveraged as platform resources accessible by multiple applications that execute on the computing device. Still further, identification of EPID groups with which a user is associated may provide an alternative method to existing personalization cookies, to enable third parties such as web servers, advertisers, or so forth, to be made aware of the user's personalization group memberships as part of a web session.

In an embodiment, privacy identifier credentials described herein may be Intel® Enhanced Privacy Identification (EPID)-based credentials, although other such credentials may be used in other embodiments. Understand that the EPID-based credentials described herein may be different than an EPID-based manufacturer credential (e.g., of a processor or other hardware of a give computing system). As such, the term "EPID" is used generically to refer to privacy identifier credentials of different types. As will be described herein, various commissioning agents may issue a set of EPID credentials (different from the manufacturer's EPID credential) to enable platform identity while preserving privacy of a user.

Embodiments may provide for a large collection of EPID groups, where each group aligns with a personalization choice, also referred to herein as a personalization group category or attribute. In an embodiment, the collection of EPID groups is maintained centrally, such as in a cloud server (or servers) of an entity responsible for the maintenance of the groups.

In operation on a user computing device, whenever a browser, mobile application or other application determines it is appropriate to capture the user's personalization attributes, the application redirects execution of the computing device (either visible to the user or in the background in a user transparent manner) to this personalization group entity. At this point, a list of personalization groups may be presented to the computing device, and responsive to selection of one or more of these personalization group categories, a given secure exchange protocol such as an EPID Join protocol described below, may be performed between the computing device and a personalization group server to instantiate an EPID private key corresponding to the EPID group for the personalization category. For example, if the personalization category is "Prefers color blue," then the personalization group server establishes a private key for the EPID group "Prefers color blue" in a private key storage resource, which may be resident on the user computing device.

If a second application desires to discover if the user has a preference for the color 'blue,' it first consults this key store resource to determine if there is an EPID key corresponding to that preference. If so, the application or browser may cause a nonce to be signed with the corresponding private key. Verification of the signature by a remote entity, such as a web server, reveals the membership in the "prefers color blue" group.

Application sandboxing does not restrict applications from benefiting from the personalization interactions occurring in other applications, so long as the key store resource is sharable across applications. In an embodiment, the key store resource may be implemented as a Trusted Computing Group trusted platform module (TPM) that maintains a hierarchy of keys available to the platform applications. In other embodiments, hardware key storage may be implemented as a hardware security module (HSM), smartcard or solid state disk (SSD).

The privacy benefit of using EPID groups versus browser or application-specific personalization is there is likely to be a large number of other people who have similar personalization interests. By joining a large group, knowledge of membership in the group will not in itself be privacy significant. In contrast, tracking personalization attributes in a cookie can be a privacy problem because a website assigns a tracking identifier to correlate preferences attributes. This identifier then becomes the thing that may be abused to violate user's privacy interests. As such, embodiments enable personalization of webpages or other information content without disclosure of a trackable cookie.

A personalization group server may operate as a service to maintain a set of personalization groups, e.g., one group for each interesting way in which to personalize a web page or other information source. As examples, such personalization groups may include an alma mater, birth city, nationality, political affiliation, ethnicity, philosophical disposition, religious affiliation, civic affiliation, club affiliation, employer, favorite color, favorite food, favorite animal, etc.

The personalization group server maintains an enrollment period in which group membership is allowed to grow and where a public key for a given personalization group is not disclosed to would-be verifiers. A threshold group size is determined that ensures a member's anonymity within the group. The public key is not distributed until this threshold group size is reached. Thus a corresponding personalization group public key is distributed to web servers and/or other information resources for a given personalization group only when group membership has reached a threshold population. This informs devices and verifiers that it is safe to begin using the corresponding key.

In embodiments, key lifecycles (e.g., revocation, deletion, joining) may be managed by the PGS/RGS by implementing a Public Key Infrastructure (PKI) that includes construction and distribution of revocation lists for EPID keys, and issuance of a group certificate. The EPID Join protocol may be implemented using a secure enrollment session based on Transport Layer Security (TLS) [Request for Comments (rfc) 5246], Datagram Transport Layer Security (DTLS) [rfc6347] or JSON Web Token (JWT) [rfc7519]. Issuance of credentials may be implemented using certificates [rfc5280], tickets [rfc4121] or minitickets [draft-hardjono-ace-fluffy-00]. The EPID key signing operations and protocol message manipulations may be performed in a trusted execution environment (TEE) that leverages Intel® Software Guard Extensions (SGX), Intel® MemCore, Intel® Converged Security Engine (CSE), Intel® virtualization technology (VT-X), Intel® IOT-OS with Smack, ARM TrustZone, among other secure environments.

Referring now to FIG. 1, shown is a flow diagram of a method for performing group preference settings for a user in accordance with an embodiment of the present invention. More specifically, method 100 shown in FIG. 1 may be performed by a combination of hardware circuitry, software, and/or firmware of a computing device, such as security logic of a processor and computing device configured to provide privacy-preserving capabilities with regard to interaction with remote computing devices, such as web servers or other remote computing devices. Note that a wide variety of different types of group preference settings may occur in different implementations. For purposes of discussion, FIG. 1 is with regard to personalization groups that enable a user to select group preference settings for different personalization features of a web page or other information content. In other cases, the group preference settings may be with regard to reputation groups for which a user may provide preference settings. Of course other types of group preference settings such as age, gender, location, favorite music or other content, preferences for transportation type, employment, recreation, etc., also may occur in other embodiments.

As illustrated in FIG. 1, method 100 begins by receiving a list of personalization groups from a personalization group server (block 110). In an embodiment, such list may be a master list maintained by the personalization group server that identifies a set of personalization groups, which may be used to personalize information provided by a web server. As described above there are myriad different ways to personalize presentation of website information, and a personalization group set may include a wide variety of personalization group categories.

Next control passes to block 120, where a personalization group category may be selected from this list of personalization groups. As an example, assume a first personalization group is for a color preference. Next, control passes to diamond 130 where it can be determined whether a user has a personal preference with regard to the particular personalization group category. A browser or other application that is to interact with a remote information source may make this determination as to each individual personalization group category of the list, in multiple loops of execution of method 100. If no preference for the personalization group is determined at diamond 130, control passes to diamond 140 to determine whether an additional personalization group category is available.

If it is determined at diamond 130 that the user does have a personal preference with regard to the particular personalization group category at issue, control passes to block 150. At block 150 an EPID Join protocol may be performed with the personalization group server, such that an EPID private key may be obtained for the given category. Details regarding an exemplary EPID Join protocol are discussed further below. Of course understand that in other embodiments, another communication protocol may be performed to enable generation of private keys for use as described herein.

Still with reference to FIG. 1, control next passes to block 160 where the EPID private key may be stored in a key store. More specifically, the computing device may include a key store resource, which in one embodiment may be implemented as a trusted platform module (TPM). Understand that in other embodiments, this key store may be implemented as another type of secure storage. After storage of this EPID private key, control passes back to diamond 140, discussed above to determine whether there are additional personalization group categories for consideration. If so, control passes to block 120 for a further iteration of the loop. Otherwise, method 100 concludes.

At the conclusion of method 100, a plurality of EPID private keys are thus stored in the key store, where each given EPID key is associated with the user and a corresponding personalization group category for which the user has a personal preference. This key store may be arranged with a plurality of entries, each to store a given EPID private key and an identifier corresponding to the given personalization group category, such that a personalization group identifier or category value may be used as an index to access the corresponding EPID private key, as described further herein. Understand while shown at this high level in the embodiment of FIG. 1, many variations and alternatives are possible.

Figure 2:
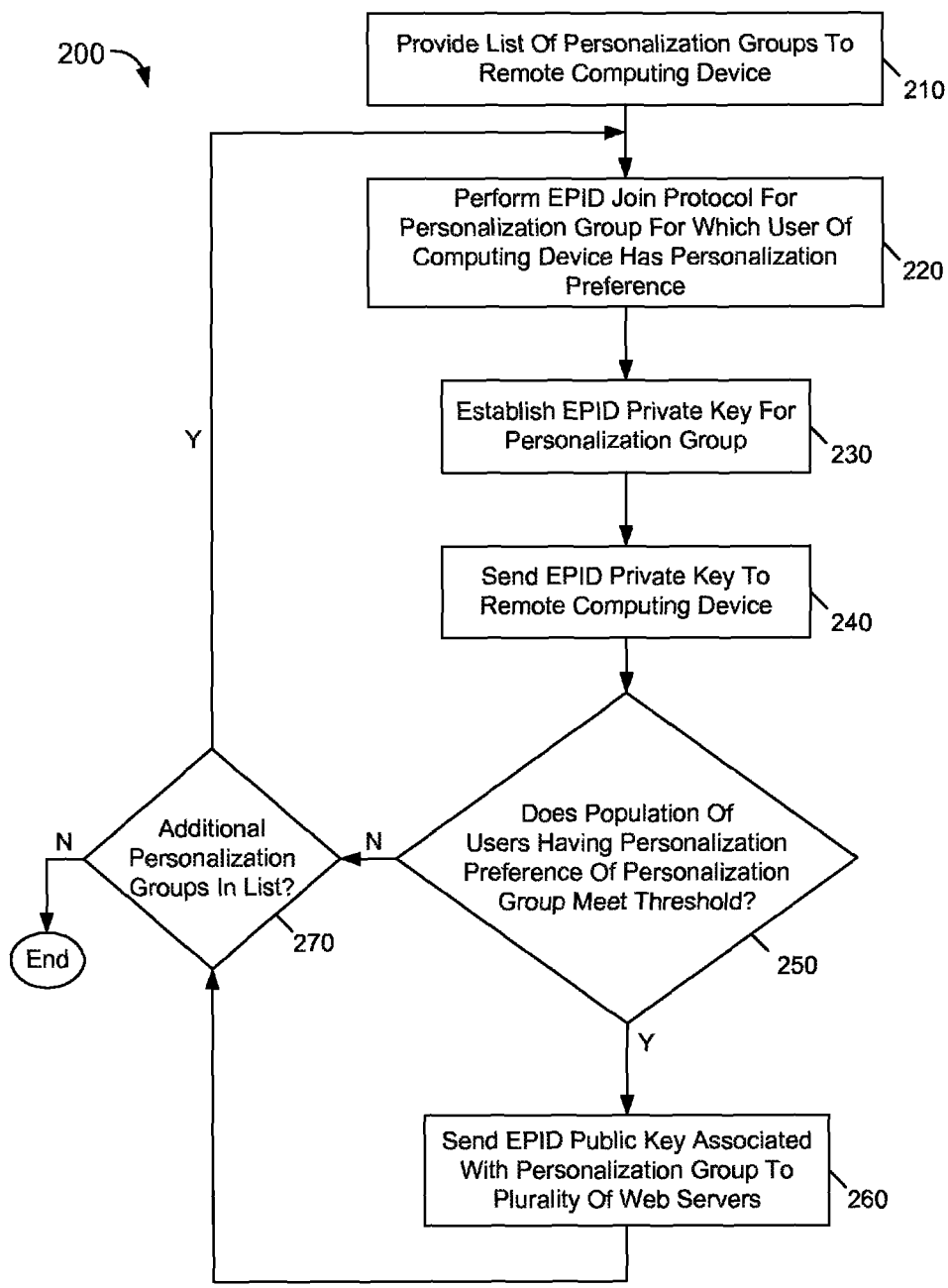
FIG. 2 is a flow diagram of a method for performing group preference settings for a user in accordance with another embodiment of the present invention

Referring now to FIG. 2, shown is a flow diagram of a method for performing group preference settings for a user in accordance with another embodiment of the present invention. More specifically, method 200 shown in FIG. 2 may be performed by a combination of hardware circuitry, software, and/or firmware of one or more personalization group computing devices, as described herein.

Method 200 shown in FIG. 2 provides operations to be performed by a personalization group server to enable the distribution of public and private EPID keys as described herein. As illustrated, method 200 begins by providing a list of personalization groups to a remote computing device, e.g., a given system of a user (block 210). Next, an EPID Join protocol may be performed for a given personalization group for which the user has a personalization preference (block 220). Note that this preference may be indicated by identifying the personalization group of the list to the personalization group server. Next at block 230 an EPID private key is established for the personalization group. Details of an exemplary EPID Join protocol to generate such private key are described further below. Thereafter at block 240 this EPID private key is sent to the remote computing device.

Understand that in the background of setting up user personalization preferences for a large number of users, counts may be maintained of individual users establishing membership in a particular personalization group category. Thus at diamond 250 it can be determined whether a population of users having this same personalization preference of the personalization group meets a threshold, e.g., corresponding to a threshold population count. If so, control passes to block 260 where an EPID public key associated with personalization group may be sent to multiple web servers (block 260). Understand that this communication of the public key thus acts as a trigger to indicate to the web servers and/or user computing devices that it is safe to provide preference information of the user for this personalization group in a manner that maintains user privacy. Control next passes to diamond 270 to determine whether there are additional personalization groups in the list to be handled. If not, method 200 concludes. Otherwise, control passes back to block 220, discussed above. Understand while shown with this particular arrangement in FIG. 2, many variations and alternatives are possible.

Figure 3:
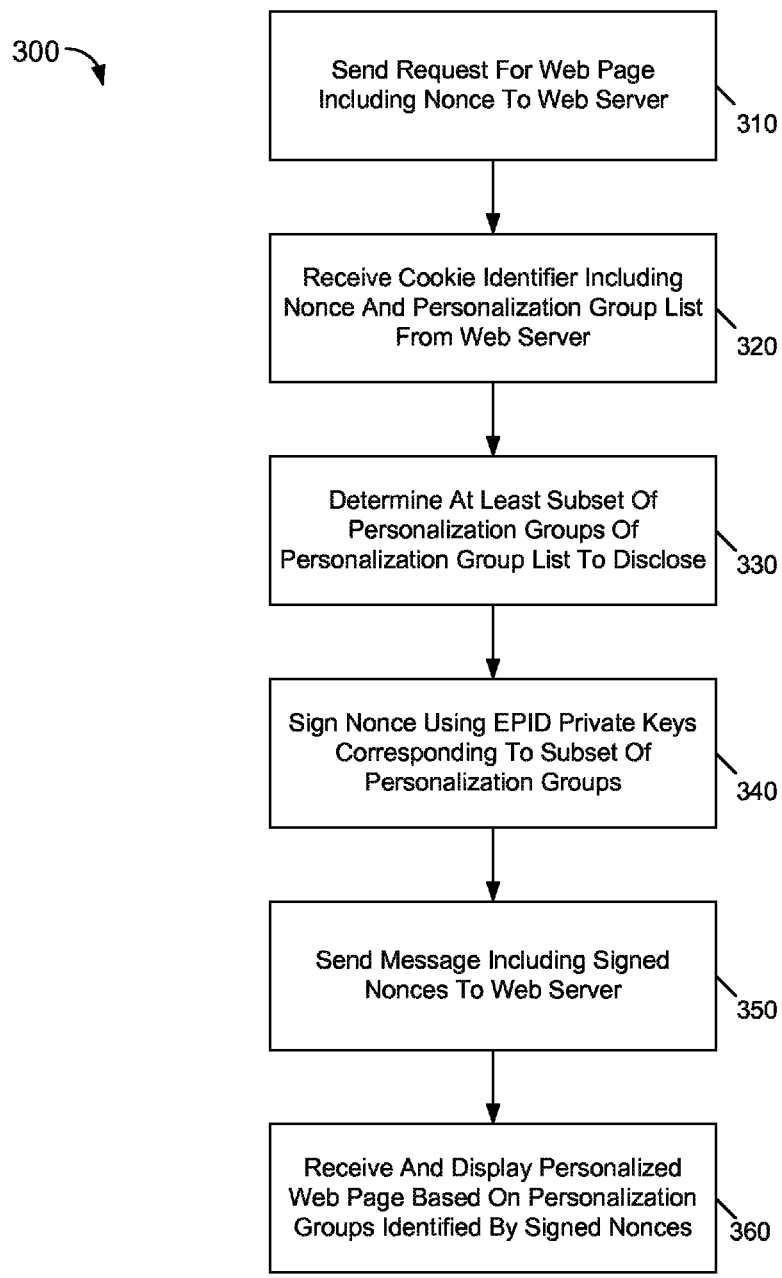
FIG. 3 is a flow diagram of a method for performing content personalization in accordance with an embodiment of the present invention.

Referring now to FIG. 3, shown is a flow diagram of a method for performing content personalization in accordance with an embodiment of the present invention. More specifically, method 300 shown in FIG. 3 may be used during interaction with a web server to enable a web page to be provided and accessed by a computing device in a personalized manner, while preserving privacy of a user. In an embodiment, method 300 may be performed at least in part by security logic of a user computing system, as described above.

As illustrated, method 300 begins by sending a request for a web page to a web server (block 310). Note that this request may include a nonce generated by a browser, where the browser is the entity that sends the request to the remote server, e.g., via the Internet.

Responsive to this request, a cookie identifier may be received from the web server (block 320). Note that in contrast to a conventional cookie that includes a unique trackable cookie identifier that can be used to identify a user of the computing device, the received cookie includes the nonce (previously transmitted from the computing device) as the cookie identifier. In addition to this nonce, the cookie includes a personalization group list. More specifically, this personalization group list may be a list of elements of a set of personalization groups that are of interest to the web server (e.g., corresponding to personalization group categories for which customization, optimization or other configurability of a web page or other information is possible). As an example, assume that a personalization group server provides for a set of 1000 personalization group categories. Further assume that for a given web server for which a computing device seeks a web page, 100 of these personalization group categories are of interest for providing customization capabilities. As such, this communication protocol between the devices may result in creation of a privacy preserving cookie. Note that in different cases, the nonce may be a web server nonce or a nonce provided by a third party (e.g., advertiser). Receipt of the nonce by the web server allows the web server/third party to know that the user responded with personalization information in the form of personalization group membership. The various signatures and nonce(s) signed thus forms the cookie.

Still with reference to FIG. 3, next at block 330 at least a subset of these personalization groups of the personalization group list for which disclosure is to occur may be determined. That is, a browser or other application may determine that at least some of the requested personalization group categories may enable the web server or other third party to determine personally identifiable information of a user and thus are not to be disclosed. As an example, assume that personalization values are available for zip code, last name and/or other categories of information. By providing too much of this information to the web server, a user may be personally identified. In other cases, this determination may be further based on population information received from the web server that indicates a number of users having the same personalization preference. As such, with greater numbers of users having common personalization preferences, the risk of providing person identifiable information by disclosure of this personalization preference is reduced.

Note that in some cases, this determination of the at least subset of personalization groups further may be based on user privacy settings, e.g., for the browser or overall user privacy settings for a system. For example, in some embodiments a browser may provide a user control by way of a slider or other adjustment knob to enable the user to indicate how much privacy the user desires (at the expense of less personalized information received). In some embodiments, the determination may further be based on user input, as a user may be presented with a list of personalization group preferences, and the user may identify which categories the user is willing to disclose and those that the user is not willing to disclose. In any event, based on all of this information, this subset of personalization groups for which disclosure is to be allowed is determined at this block 330. As such, embodiments enable at least some customization or personalization of a web page while maintaining user privacy. To this end, at block 330 the browser or other application may limit this subset of personalization values to a limited number or particular personalization values of this list such that identification of the user cannot be reasonably by determined.

Next at block 340 the nonce may be signed using the corresponding EPID private keys of this subset. In one embodiment, the nonce may be individually signed by each EPID private key for the determined subset. Thus assume in this further example that of the 100 personalization categories identified by the web server, the browser or other application determines that 50 of these categories are acceptable to enable customization without personally identifying the user.

Still with reference to FIG. 3, next at block 350 the computing device may send a message including the signed nonces to the web server. Responsive to receipt of this message, the web server may verify each of the signatures of this message using the corresponding EPID public key for the personalization group category. And responsive to verification of these signatures, the web server may generate a web page or other information source that reflects the personalization interests of the user. Thus at block 360, the computing device may receive and display a personalized web page based on the personalization groups identified by the signed nonces. Note that this web page may not be fully customized, given the less than full information provided to the web server, but with privacy maintained, a large amount of customization may still be possible. Understand while shown at this high level in the embodiment of FIG. 3, many variations and alternatives are possible.

Figure 4:
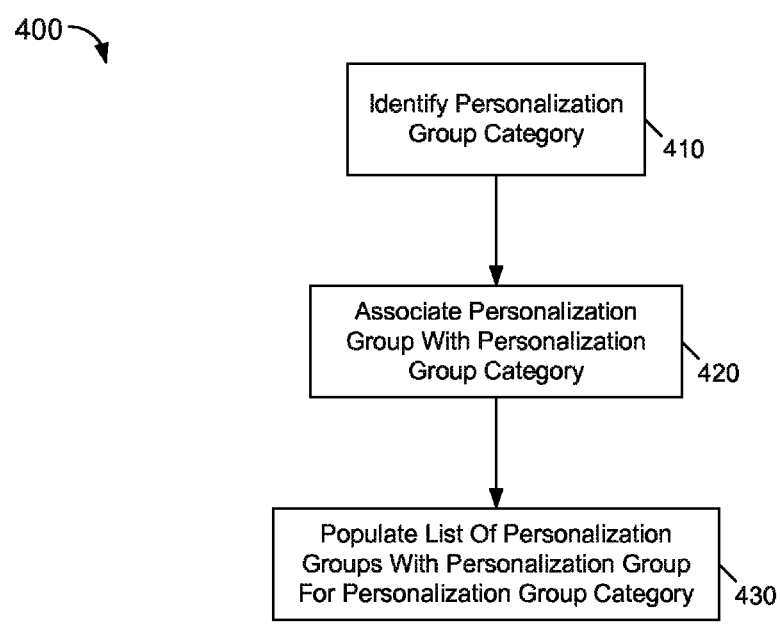
FIG. 4 is a flow diagram of a method for creating personalization groups in accordance with an embodiment.

Referring now to FIG. 4, shown is a flow diagram of a method for creating personalization groups in accordance with an embodiment of the present invention. Method 400 may be performed by combinations of hardware circuitry, software, and/or firmware of a personalization group server. Method 400 may be performed to initially populate a list of personalization groups that then may be published and/or otherwise provided to many different entities, including a variety of different information content providers, as well as industry groups and companies, who may determine applicability of personalization groups to their own operations.

As illustrated, method 400 begins by identifying a personalization group category (block 410). Note that such identification may be based on a variety of different inputs, including analyses of different websites and other information content to determine types of information that may be personalized. Still further, heuristic analyses may be performed to identify such personalization group categories. Next at block 420 a personalization group may be associated with a given personalization group category. For example, a personalization group identifier or identifiers (e.g., a numerical value and a corresponding text string) may be associated with the personalization group category to enable systems and users alike to identify the personalization group category associated with a particular personalization group. Thereafter at block 430 a list of personalization groups may be populated with this personalization group.

Understand that an originally created list of personalization groups may be dynamically updated, as additional personalization groups become identified. Furthermore, one or more personalization groups present in the list may be de-populated for a variety of reasons. While shown at this high level in FIG. 4, many variations and alternatives are possible.

Figure 5:
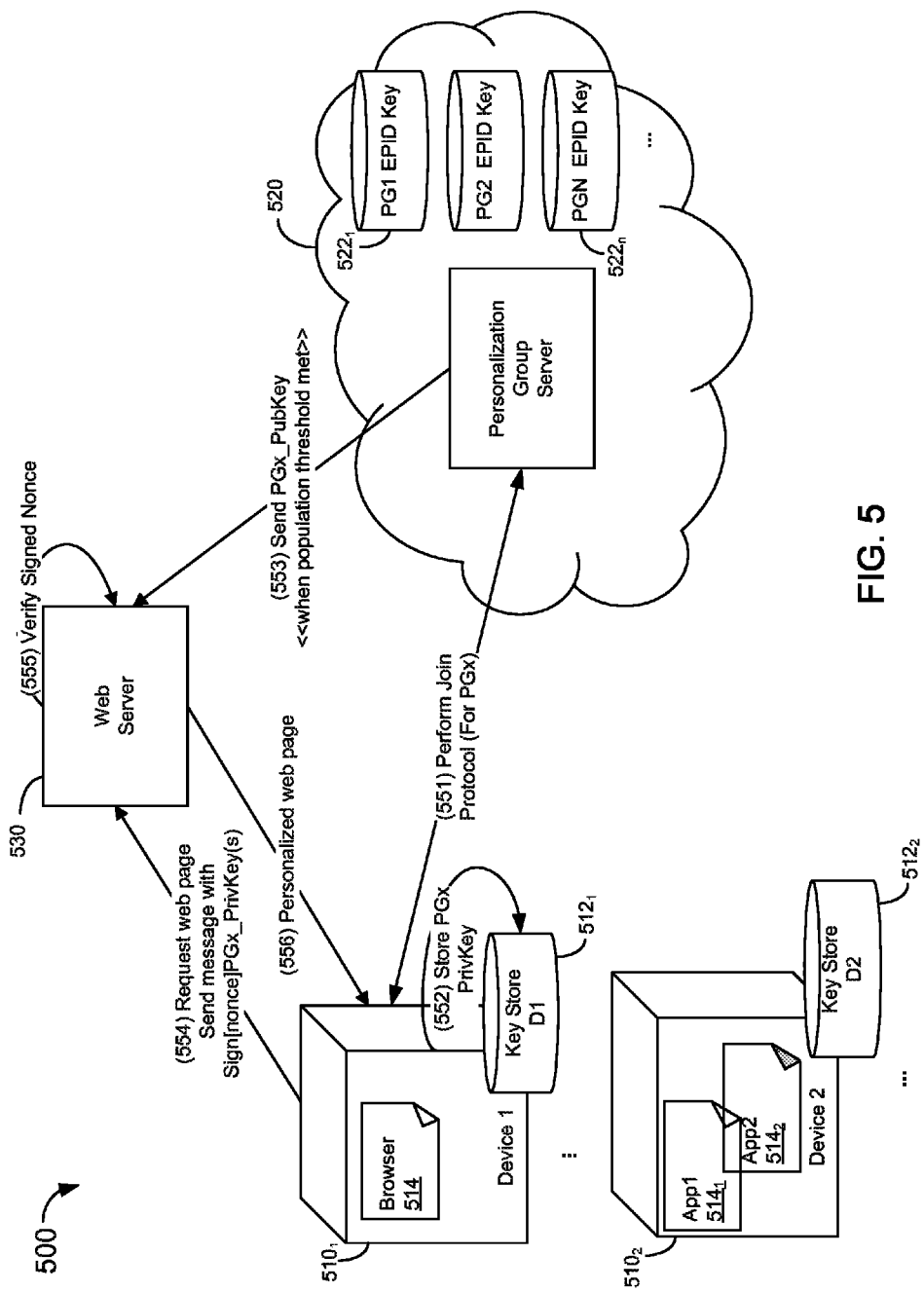
FIG. 5 is a block diagram of a system architecture in accordance with an embodiment of the present invention.

Referring now to FIG. 5, shown is a block diagram of a system architecture in accordance with an embodiment of the present invention. As shown in FIG. 5, architecture 500 includes different computing devices coupled together via a variety of different network connections. As examples, one or more computing devices $510_1$ and $510_2$, which may be user computing devices, e.g., desktop computers, laptop computers, tablet computers, smartphones or other portable devices, may couple via a wide area network (e.g., an Internet connection) with a personalization group server 520. In addition, a representative web server 530 is shown, located remotely from both computing devices 510 and personalization group server 520. Web server 530 is associated with, e.g., a particular web page creator or distributor, such as a news source, retailer, content provider, cloud provider or so forth. As such, web server 530 may be configured as one or more server computers located at a given cloud-based location.

Although the scope of the present invention is not limited in this regard, in an embodiment architecture 500 may provide for a single personalization group entity, which may be implemented as a collection of server computers 520, e.g., at a cloud-based location, to provide an authoritative database of personalization group categories or attributes. Although different examples are possible, personalization group server 520 may be associated with an independent computing agency, educational agency, non-profit agency or so forth that identifies and establishes a set of acceptable personalization groups or categories. Understand that over time, such set of personalization group categories may be dynamically updated by adding or removing particular personalization group categories. In some cases, the entity responsible for personalization group server 520 may seek approval for proposed personalization group categories from a variety of entities, including websites or other technology groups, and privacy-interested entities. Also, based on concerns identified from actual Internet usage and reported primary concerns, it is possible for one or more personalization group categories to be removed from an acceptable set of personalization group categories.

As further illustrated in FIG. 5, personalization group server 520 may include or be associated with a storage to store a plurality of personalization group public (e.g., EPID) keys $522_1$-$522_n$. Understand that each such EPID key may be a public key for a given personalization group category. Note however that to preserve privacy, such public keys may not be released to any third party, e.g., web server, until at least a threshold population of users identifying with the corresponding personalization group category has been established.

As further illustrated in FIG. 5, a variety of communications occur between the various entities to enable, at the completion of a given protocol, personalization of webpage information provided from web server 530 to a given computing device 510. As illustrated in FIG. 5, such operations may begin at process 551, which may be implemented as a personalization group join process as described herein to enable a user of device 510 to identify, via a browser 514 or other application, one or more personal preferences for customization of a website. To this end, personalization group join process 551 may result in provision of a plurality of personalization group private (e.g., EPID) keys, which may be stored at process 552 in a key store 512. As described herein, key store 512 may be implemented as a given secure storage, e.g., by way of a TPM or other protected storage, such as may be protected by a TEE.

Still with reference to FIG. 5, when a population threshold for a given personalization group category has been achieved, at process 553 an EPID public key corresponding to the personalization group may be sent from personalization group server 520 to web server 530. Understand that at this threshold point, this public key may be sent to a large amount of such web servers. The population threshold may vary in different embodiments, but the threshold may be a substantial amount of individual users that identify with a given personal preference before allowing communication of the public key to third party entries, to preserve privacy. At this point, both computing device 510 and web server 530 are configured to enable privacy-preserving interactions as described herein.

Accordingly, at process 554 a user, e.g., via browser 514, may send a request to web server 530 for access to a webpage. This request includes a nonce supplied by the browser. Rather than returning a cookie with a unique trackable cookie identifier, web server 530 returns the nonce as the cookie identifier and the list of personalization value interesting to it, which may be a subset of a full list of personalization groups maintained by personalization group server 510. Browser 514 or other application determines whether a user has a personal preference that aligns with a supported category and if so signs the nonce with the corresponding personalization group private key. Instead of a conventional cookie, browser 514 may send a signed nonce signed using one or more personalization private keys as proof of membership in the personalization groups. More specifically, this nonce may be signed by using each of the EPID private keys present in key store 512. Responsive to receipt of this request, web server 530 may verify the personalization (e.g., using the corresponding EPID public keys) that correspond to the server's interested personalization attributes.

Responsive to such verification, web server 530 may personalize the webpage as appropriate and at process 556 send a personalized webpage to device 510, to enable browser 514 to display the webpage and enable user interaction. Understand while shown at this high level in the embodiment of FIG. 5, many variations and alternatives are possible.

Note that since client device 510 chose the cookie nonce, it is free to discard the nonce at each use, thereby making it impossible for the nonce to be used to correlate subsequent web page requests or to collude with other web servers. As a performance optimization, a browser or other application may opt to pre-sign a nonce to avoid incurring signing latency at the time a web page is requested. As another optimization, composite groups may be generated to allow a single signature to represent multiple group memberships. For example, a composite group describing modes of transportation preferences might identify automobiles, and which is further divided into sports cars and all-wheel drive (AWD) vehicles. Rather than define two groups (sports cars and AWD vehicles), a composite group (sports_cars_AND_AWDvechicles) may be defined such that if the preference for either is true, membership in the group is true.

As one example, an EPID Join protocol may be according to the following:
1. The issuer chooses an Intel® EPID group for the member. Let gid be the chosen group ID. Let (gid, h1, h2, w) be the group public key and (gid, gamma) be the group issuing private key.
2. Let NI be a 256-bit nonce chosen by the issuer.
3. The member chooses a random integer f between [1, p−1] or derives f between [1, p−1] from some seed value.
4. The member runs a JoinP process to create a join request (F, c, s).
5. The member sends the join request (F, c, s) to the issuer.
6. The issuer runs the Join1 process to create a membership credential (gid, A, x) for member.
7. The issuer sends the membership credential (gid, A, x) to the member.
8. The member concatenates the membership credential (gid, A, x) received and the f value generated in step 3 into an Intel® EPID private key (gid, A, x, f). The member can validate the private key.

In another embodiment, a reputation group server may be provided and used in much the same fashion as a personalization group server, except that groups are defined in terms of reputation. For example, one group may represent those with credit score above 900 and another group is formed of those below 900 but above 800. Ranking on Angie's List™ or other ratings system may be another dimension of reputation. Each category of reputation can be defined, where groups are defined by the rating system's bucketing semantics.

Figure 6:
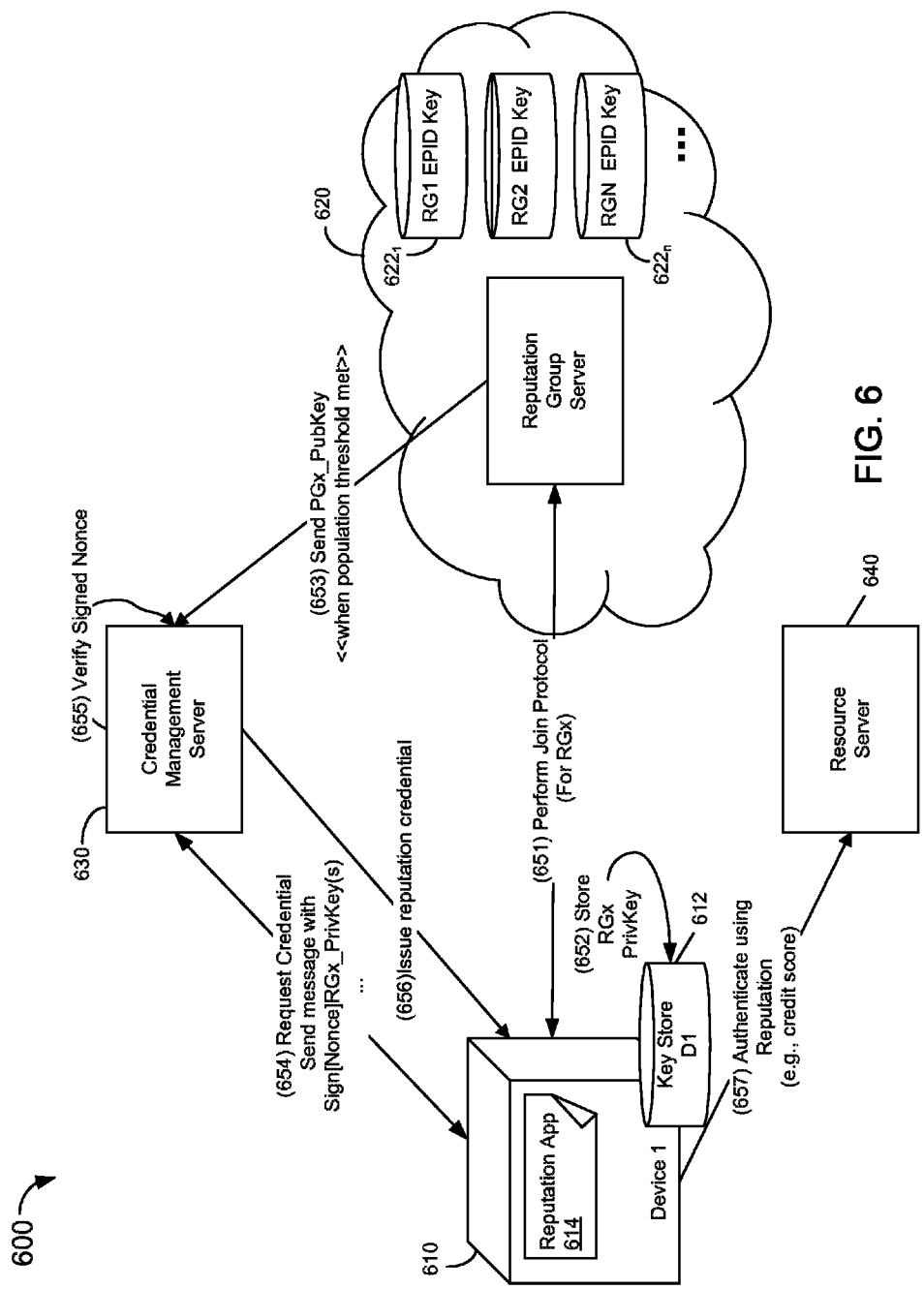
FIG. 6 is a block diagram of a system architecture in accordance with another embodiment of the present invention.

Referring now to FIG. 6, shown is a block diagram of a system architecture in accordance with another embodiment of the present invention. As shown in FIG. 6, architecture 600 includes different computing devices coupled together via a variety of different network connections. A computing device 610, which may be a user computing devices, may couple via a wide area network with a reputation group server (RGS) 620. In addition, a representative credential management server (CMS) 630 is shown, located remotely from both computing devices 610 and reputation group server 620. RGS 620 may be configured as one or more server computers located at a given cloud-based location to generate reputation credentials as described herein.

As further illustrated in FIG. 6, reputation group server 620 may include or be associated with a storage to store a plurality of personalization group public (e.g., EPID) keys $622_1$-$622_n$. Understand that each such EPID key may be a public key for a given reputation group category. Note however that to preserve privacy, such public keys may not be released to any third party, e.g., credential management server, until at least a threshold population of users identifying with the corresponding reputation group category has been established.

As further illustrated in FIG. 6, a variety of communications occur between the various entities to enable, at the completion of a given protocol, communication of privacy-preserving reputation information to a resource server 640 may occur. In this embodiment, a reputation application 614 registers the user's reputation with a RGS 600 by invoking the EPID Join protocol over an appropriate reputation group (process 651). This results in the reputation application receiving a private key corresponding to the reputation group (process 652). This reputation group key may be stored in a key store resource 614.

RGS 600 informs CMS 630 when a RGS group has a sufficient population that ensures anonymity of group members, should sufficient (e.g., a threshold) amount of membership in the group be established (process 653). At this point, reputation application 614 requests a reputation credential from CMS 630 (process 654). The request is signed by the RG private group keys, and may be performed similar to the above embodiment, by signing a nonce with the appropriate RG private keys (process 655). The public key that may be used to identify the user to a resource server may also be included in the request. CMS 630 verifies the reputation signatures (process 655) and considers a composite reputation valuation. An identity credential is minted that asserts the user's reputation, possibly, without assigning a unique user identifier; though this may be done as well. This identity credential is supplied to computing device 610 (process 656). When the client wishes to authenticate to a resource server 640 and assert a reputation, the minted credential is used (block 657).

In some cases, the client may seek to remain anonymous to the resource server while also asserting a reputation value. This is achieved by further using the EPID Join protocol to return an EPID group private key corresponding to a group having a reputation value. The group credential establishes that the user is a member of a group where the reputation of the individual is specified, but where an identifier that may be used to further track the user across subsequent sessions is not specified.

Figure 7:
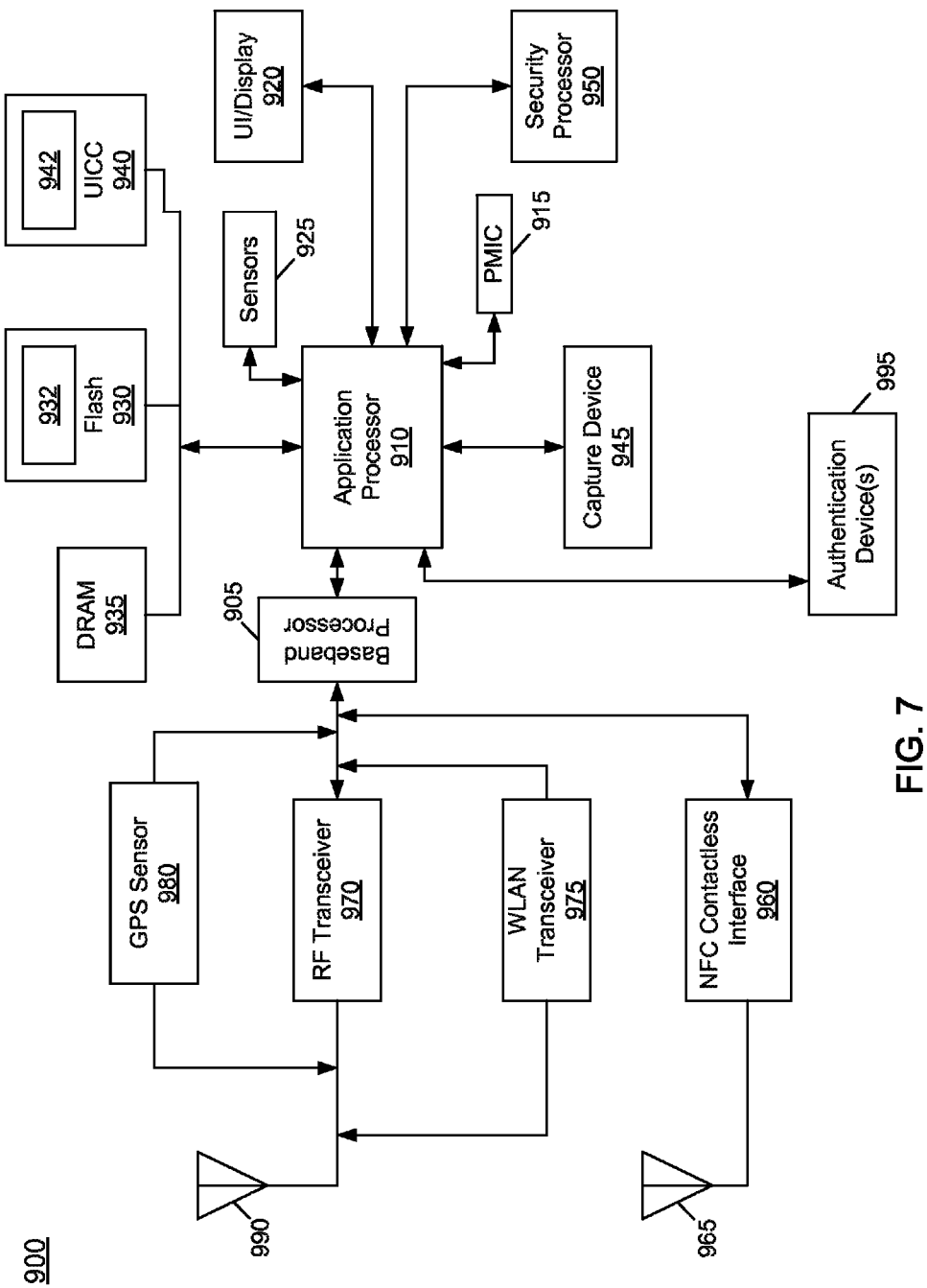
FIG. 7 is a block diagram of an example system with which embodiments can be used.

Referring now to FIG. 7, shown is a block diagram of an example system with which embodiments can be used. As seen, system 900 may be a smartphone or other wireless communicator or any other type of computing device, which may be a user computing device with which customized or personalized information content may be processed and displayed. A baseband processor 905 is configured to perform various signal processing with regard to communication signals to be transmitted from or received by the system. In turn, baseband processor 905 is coupled to an application processor 910, which may be a main CPU of the system to execute an OS and other system software, in addition to user applications such as many well-known social media and multimedia apps and/or a browser which may configure personalization attributes as described herein. Application processor 910 may further be configured to perform a variety of other computing operations for the device.

In turn, application processor 910 can couple to a user interface/display 920, e.g., a touch screen display. In addition, application processor 910 may couple to a memory system including a non-volatile memory, namely a flash memory 930 and a system memory, namely a DRAM 935. In some embodiments, flash memory 930 may include a secure portion 932 in which secrets and other sensitive information may be stored. As further seen, application processor 910 also couples to a capture device 945 such as one or more image capture devices that can record video and/or still images.

Still referring to FIG. 7, a universal integrated circuit card (UICC) 940 comprises a subscriber identity module, which in some embodiments includes a secure storage 942 to store secure user information, including group private keys as described herein. System 900 may further include a security processor 950 that may that may implement a trusted execution environment (TEE), and which may couple to application processor 910 to enable inter-application access to the group private keys. Furthermore, application processor 910 may implement a secure mode of operation, such as Intel® Software Guard Extensions (SGX) to a given instruction set architecture, and circuitry for hosting of a TEE. A plurality of sensors 925, including one or more multi-axis accelerometers may couple to application processor 910 to enable input of a variety of sensed information such as motion and other environmental information, including safety-related information as described herein. In addition, one or more authentication devices 995 may be used to receive, e.g., user biometric input for use in authentication operations.

As further illustrated, a near field communication (NFC) contactless interface 960 is provided that communicates in a NFC near field via an NFC antenna 965. While separate antennae are shown in FIG. 7, understand that in some implementations one antenna or a different set of antennae may be provided to enable various wireless functionality.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received such as in one or more IoT networks, various circuitry may be coupled between baseband processor 905 and an antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 980 may be present, with location information being provided to security processor 950. Other wireless communications such as receipt or transmission of radio signals, e.g., AM/FM and other signals may also be provided. In addition, via WLAN transceiver 975, local wireless communications, such as according to a Bluetooth™ or IEEE 802.11 standard can also be realized.

Figure 8:
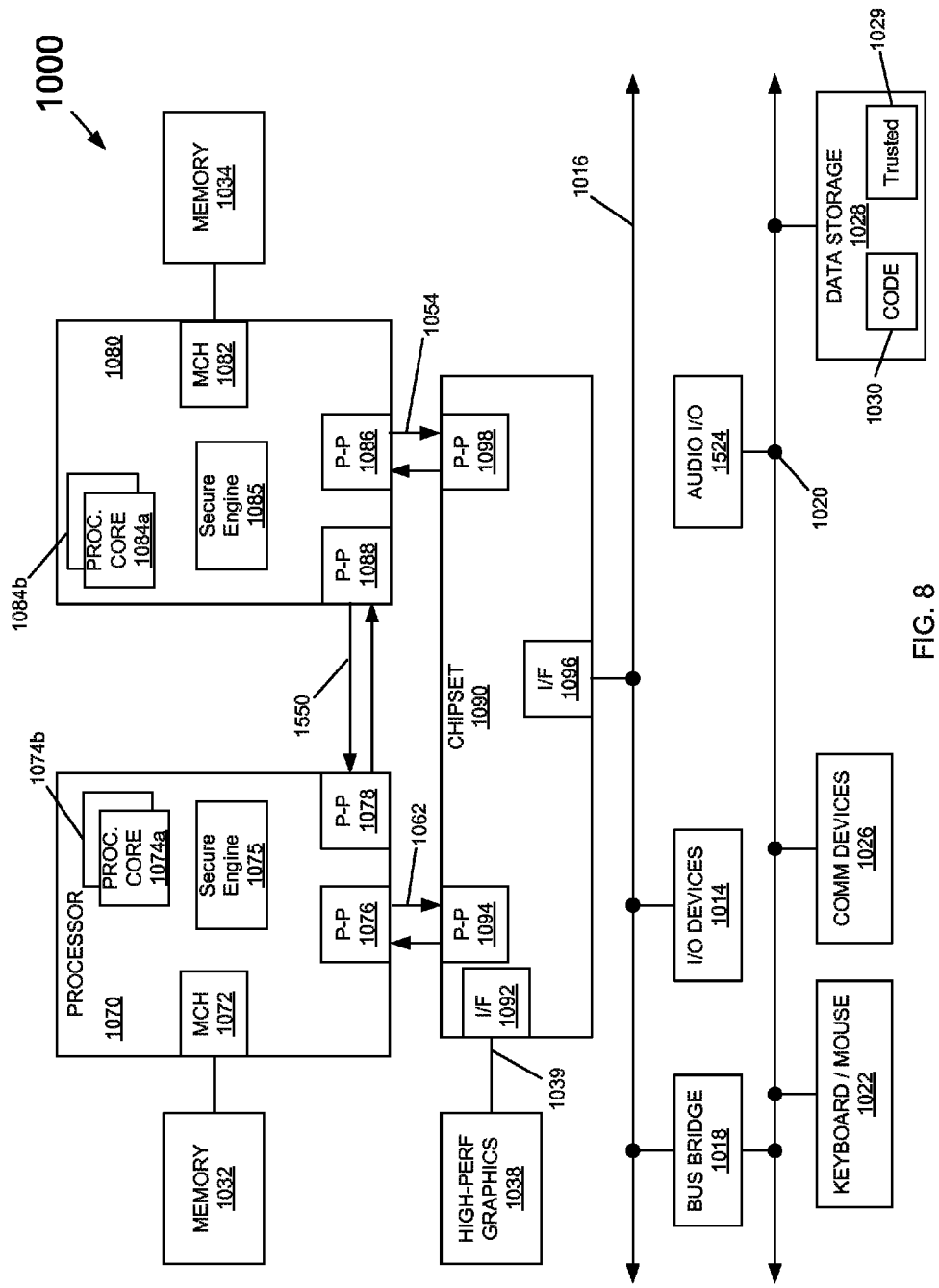
FIG. 8 is a block diagram of a system in accordance with another embodiment of the present invention.

Referring now to FIG. 8, shown is a block diagram of a system in accordance with another embodiment of the present invention. As shown in FIG. 8, multiprocessor system 1000 is a point-to-point interconnect system such as a server system, e.g., of a personalization and/or reputation group server and/or of a credential management server, a content provider server or so forth. System 1000 includes a first processor 1070 and a second processor 1080 coupled via a point-to-point interconnect 1050. As shown in FIG. 8, each of processors 1070 and 1080 may be multicore processors such as SoCs, including first and second processor cores (i.e., processor cores 1074a and 1074b and processor cores 1084a and 1084b), although potentially many more cores may be present in the processors. In addition, processors 1070 and 1080 each may include a secure engine 1075 and 1085 to perform security operations such as key management, including the group membership protocols, public and private key distributions and so forth, described herein.

Still referring to FIG. 8, first processor 1070 further includes a memory controller hub (MCH) 1072 and point-to-point (P-P) interfaces 1076 and 1078. Similarly, second processor 1080 includes a MCH 1082 and P-P interfaces 1086 and 1088. As shown in FIG. 8, MCH's 1072 and 1082 couple the processors to respective memories, namely a memory 1032 and a memory 1034, which may be portions of main memory (e.g., a DRAM) locally attached to the respective processors. First processor 1070 and second processor 1080 may be coupled to a chipset 1090 via P-P interconnects 1052 and 1054, respectively. As shown in FIG. 8, chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. As shown in FIG. 8, various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a non-volatile storage or other mass storage device. As seen, data storage unit 1028 may include code 1030, in one embodiment. As further seen, data storage unit 1028 also includes a trusted storage 1029 to store sensitive information to be protected. Further, an audio I/O 1024 may be coupled to second bus 1020.

The following Examples pertain to further embodiments.

In Example 1, a system comprises: a hardware processor to execute instructions; a hardware key storage coupled to the hardware processor, the hardware key storage to store a plurality of group private keys, each of the plurality of group private keys associated with a personalization preference of a user; and at least one storage medium. In an embodiment, the storage medium may include instructions that when executed enable the hardware processor to: receive a user request to access a website; sign a nonce with at least some of the plurality of group private keys, the at least some of the plurality of group private keys corresponding to personalization attributes of the website; and send the signed nonce to a web server to enable personalized interaction with the web server.

In Example 2, the medium may further comprise instructions that when executed enable the hardware processor to: send the nonce to the web server with the user request to access the website; and receive the nonce from the web server and a list of personalization groups and thereafter sign the nonce.

In Example 3, the medium may further comprise instructions that when executed enable the hardware processor to determine the at least some of the plurality of group private keys with which to sign the nonce based at least in part on the list of personalization groups, each of the at least some of the plurality of group private keys associated with one of the groups of the list of personalization groups.

In Example 4, the medium may further comprise instructions that when executed enable the hardware processor to: receive membership information indicative of a population of users having a personalization preference for a corresponding group of the list of personalization groups; and determine the at least some of the plurality of group private keys with which to sign the nonce based at least in part on the membership information.

In Example 5, the medium may further comprise instructions that when executed enable the hardware processor to determine to sign the nonce with a first group private key when the membership information indicates that at least a threshold number of users have the personalization preference for the corresponding group, the threshold number defined by the user.

In Example 6, the medium may further comprise instructions that when executed enable the hardware processor to determine the at least some of the plurality of group private keys with which to sign the nonce further based on a user privacy setting for a browser of the system.

In Example 7, the hardware processor of one or more of the above Examples is to sign the nonce with less than all of the plurality of group private keys, to maintain anonymity of the user.

In Example 8, the hardware processor of one or more of the above Examples is to identify a subset of the plurality of group private keys associated with groups having potentially user identifying information and not sign the nonce with the subset of the plurality of group private keys.

In Example 9, the hardware processor of one or more of the above Examples is to perform a join communication protocol with a group server to obtain the plurality of group private keys, the plurality of group private keys corresponding to enhanced privacy identifier keys, the group server at least one of a personalization group server and a reputation group server.

In Example 10, the system further comprises a cache memory to store a pre-signed nonce, and further comprising instructions that when executed enable the system to send the pre-signed nonce to the web server responsive to the user request.

In Example 11, the hardware key storage comprises a shared resource accessible to a plurality of applications to execute on the system, where at least some of the plurality of applications are isolated from others of the plurality of applications.

In Example 12, the hardware key storage comprises a trusted platform module.

In Example 13, the personalized interaction comprises a personalized representation of the website, without communication of a trackable cookie.

In Example 14, a method comprises: generating a list of groups, each of the groups of the list of groups associated with a group category for which presentation of information can be personalized; providing the list of groups to a plurality of computing devices, to enable establishment of a set of private keys for each computing device, each of the set of private keys to identify a set of group categories for which a user of the computing device has a personalization preference; determining whether a population of users having a personalization preference for a particular group category exceeds a threshold; and responsive to the determination, providing a public key associated with the particular group category to a plurality of web servers, to enable the plurality of web servers to provide personalization of the presentation of information with respect to the personalization preference.

In Example 15, the method further comprises performing a join communication protocol to provide the set of private keys to a computing device of the plurality of computing devices for the set of group categories for which a user of the computing device has a personalization preference.

In Example 16, the web server comprises a credential manager server, and where the credential manager server is to provide a reputation credential to the user of the computing device responsive to verification, via the public key, of a credential request from the computing device.

In Example 17, the method further comprises providing a set of public keys to each of the plurality of web servers, each of the set of public keys associated with a particular group category having the population of users that exceeds the threshold.

In Example 18, a method comprises: responsive to a request from a first remote computing device for access to information content, sending, from a first server coupled to the first remote computing device, a list of group categories to the first remote computing device, each group category of the list of group categories to identify a customization attribute for the information content; receiving, in the first server, a set of values from the first remote computing device, each of the set of values signed by a private key of the first remote computing device associated with a group category of a subset of group categories of the list of group categories; and customizing the information content based on the set of values and sending the customized information content to the first remote computing device.

In Example 19, the method further comprises responsive to the request from the first remote computing device, sending a nonce with the list of group categories to the first remote computing device.

In Example 20, the set of values comprises the nonce signed with a plurality of private keys of the first remote computing device associated with the subset of group categories.

In Example 21, the method further comprises: verifying the set of values using corresponding public keys received from a group server coupled to the first server; receiving the list of group categories from the group server; and receiving a public key for a first group category of the list of group categories when a predetermined number of users are associated with the customization attribute.

In another Example, a computer readable medium including instructions is to perform the method of any of the above Examples.

In another Example, a computer readable medium including data is to be used by at least one machine to fabricate at least one integrated circuit to perform the method of any one of the above Examples.

In another Example, an apparatus comprises means for performing the method of any one of the above Examples.

In Example 22, a system comprises: means for sending a list of group categories to a first remote computing device, each group category of the list of group categories to identify a customization attribute for information content; means for receiving a set of values from the first remote computing device, each of the set of values signed by a private key of the first remote computing device associated with a group category of a subset of group categories of the list of group categories; means for customizing the information content based on the set of values; and means for sending the customized information content to the first remote computing device.

In Example 23, the system further comprises means for sending a nonce with the list of group categories to the first remote computing device, where the set of values comprises the nonce signed with a plurality of private keys of the first remote computing device associated with the subset of group categories.

Understand that various combinations of the above Examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
   a hardware processor to execute instructions;
   a hardware key storage coupled to the hardware processor, the hardware key storage to store a plurality of group private keys, each of the plurality of group private keys associated with a personalization preference of a user; and
   at least one storage medium including instructions that when executed enable the hardware processor to:
      receive a user request to access a website;
      send a nonce to a web server with the user request to access the website;
      receive the nonce from the web server and a list of personalization groups;
      receive membership information indicative of a population of users having a personalization preference for a corresponding group of the list of personalization groups;
      determine at least some of the plurality of group private keys with which to sign the nonce based at least in part on the membership information, the at least some of the plurality of group private keys corresponding to personalization attributes of the website;
      sign the nonce with the at least some of the plurality of group private keys including a first group private key when the membership information indicates that at least a threshold number of users have the personalization preference for the corresponding group, the threshold number defined by the user; and
      send the signed nonce to the web server to enable personalized interaction with the web server.

2. The system of claim 1, further comprising instructions that when executed enable the hardware processor to determine the at least some of the plurality of group private keys with which to sign the nonce based at least in part on the list of personalization groups, each of the at least some of the plurality of group private keys associated with one of the groups of the list of personalization groups.

3. The system of claim 1, further comprising instructions that when executed enable the hardware processor to determine the at least some of the plurality of group private keys with which to sign the nonce further based on a user privacy setting for a browser of the system.

4. The system of claim 1, wherein the hardware processor is to sign the nonce with less than all of the plurality of group private keys, to maintain anonymity of the user.

5. The system of claim 1, wherein the hardware processor is to identify a subset of the plurality of group private keys associated with groups having potentially user identifying information and not sign the nonce with the subset of the plurality of group private keys.

6. The system of claim 1, wherein the hardware processor is to perform a join communication protocol with a group server to obtain the plurality of group private keys, the plurality of group private keys corresponding to enhanced privacy identifier keys, the group server being at least one of a personalization group server and a reputation group server.

7. The system of claim 1, further comprising a cache memory to store a pre-signed nonce, and further comprising instructions that when executed enable the system to send the pre-signed nonce to the web server responsive to the user request.

8. The system of claim 1, wherein the hardware key storage comprises a shared resource accessible to a plurality of applications to execute on the system, wherein at least some of the plurality of applications are isolated from others of the plurality of applications.

9. The system of claim 1, wherein the hardware key storage comprises a trusted platform module.

10. The system of claim 1, wherein the personalized interaction comprises a personalized representation of the website, without communication of a trackable cookie.

11. At least one computer readable storage medium comprising instructions that when executed enable a system to:
   generate a list of groups, each of the groups of the list of groups associated with a group category for which presentation of information can be personalized;
   provide the list of groups to a plurality of computing devices, to enable establishment of a set of private keys for each computing device, each of the set of private keys to identify a set of group categories for which a user of the computing device has a personalization preference;

determine whether a population of users having a personalization preference for a particular group category exceeds a threshold; and responsive to the determination, provide a public key associated with the particular group category to a plurality of web servers, to enable the plurality of web servers to provide personalization of the presentation of information with respect to the personalization preference;

wherein a web server from among the plurality of web servers comprises a credential manager server, and wherein the credential manager server is to provide a reputation credential to the user of the computing device responsive to verification, via the public key, of a credential request from the computing device.

12. The at least one computer readable medium of claim 11, further comprising instructions that when executed enable the system to perform a join communication protocol to provide the set of private keys to a computing device of the plurality of computing devices for the set of group categories for which a user of the computing device has a personalization preference.

13. The at least one computer readable medium of claim 11, further comprising instructions that when executed enable the system to provide a set of public keys to each of the plurality of web servers, each of the set of public keys associated with a particular group category having the population of users that exceeds the threshold.

14. A method comprising:

responsive to a request from a first remote computing device for access to information content, sending, from a first server coupled to the first remote computing device, a list of group categories to the first remote computing device, each group category of the list of group categories to identify a customization attribute for the information content;

responsive to the request from the first remote computing device, sending a nonce with the list of group categories to the first remote computing device;

receiving, in the first server, a set of values from the first remote computing device, each of the set of values signed by a private key of the first remote computing device associated with a group category of a subset of group categories of the list of group categories, wherein the set of values comprises the nonce signed with a plurality of the private keys of the first remote computing device associated with the subset of group categories; and customizing the information content based on the set of values and sending the customized information content to the first remote computing device.

15. The method of claim 14, further comprising verifying the set of values using corresponding public keys received from a group server coupled to the first server.

16. The method of claim 15, further comprising:

receiving the list of group categories from the group server; and receiving a public key for a first group category of the list of group categories when a predetermined number of users are associated with the customization attribute.

17. The method of claim 14, wherein the customization attribute comprises a reputation attribute.

* * * * *